(12) United States Patent
Oren

(10) Patent No.: US 8,403,502 B2
(45) Date of Patent: Mar. 26, 2013

(54) COLLIMATED VISUAL DISPLAY WITH ELLIPTICAL FRONT PROJECTION SCREEN

(75) Inventor: Moshe Oren, Beavercreek, OH (US)

(73) Assignee: Barco N.V., Kortrijk (BE)

(*) Notice: Subject to any disclaimer, the term of this patent is extended or adjusted under 35 U.S.C. 154(b) by 652 days.

(21) Appl. No.: 12/273,053

(22) Filed: Nov. 18, 2008

(65) Prior Publication Data

US 2010/0123880 A1    May 20, 2010

(51) Int. Cl.
*G03B 21/28* (2006.01)

(52) U.S. Cl. ............... 353/98; 353/71; 353/77; 353/78; 353/79; 353/99; 353/119; 353/122; 359/449

(58) Field of Classification Search .............. 353/31, 353/71, 77, 78, 98, 99, 79, 119, 122; 359/449, 359/451, 460; 348/123, 335; 352/69, 152, 352/43, 86, 132
See application file for complete search history.

(56) References Cited

U.S. PATENT DOCUMENTS

| | | | | |
|---|---|---|---|---|
| 3,784,742 A * | 1/1974 | Burnham et al. | ............. | 348/123 |
| 3,807,849 A * | 4/1974 | Lobb | ............... | 353/98 |
| 3,816,005 A | 6/1974 | Kirschner | | |
| 3,904,289 A * | 9/1975 | Yager | ............ | 353/122 |
| 4,045,116 A | 8/1977 | La Russa | | |
| 4,167,311 A * | 9/1979 | Pund | ............... | 353/99 |
| 4,348,187 A * | 9/1982 | Dotsko | ......................... | 434/44 |
| 4,427,274 A | 1/1984 | Pund et al. | | |
| 5,175,575 A * | 12/1992 | Gersuk | ......................... | 353/94 |
| 5,926,153 A | 7/1999 | Ohishi et al. | | |
| 6,262,849 B1 | 7/2001 | Potin et al. | | |
| 6,504,658 B1 | 1/2003 | Bignolles et al. | | |
| 6,735,015 B1 * | 5/2004 | Blackham | ..................... | 359/451 |
| 6,796,662 B2 | 9/2004 | Akiyama | | |
| 6,944,581 B2 | 9/2005 | Creek | | |
| 7,030,951 B2 | 4/2006 | Suzuki et al. | | |
| 7,111,943 B2 * | 9/2006 | Agostinelli et al. | ............ | 353/79 |
| 7,352,340 B2 * | 4/2008 | Utt et al. | ......................... | 345/32 |
| 2003/0210380 A1 | 11/2003 | Westort et al. | | |
| 2004/0184013 A1 | 9/2004 | Raskar et al. | | |
| 2006/0114676 A1 | 6/2006 | Yamada et al. | | |
| 2007/0285797 A1 * | 12/2007 | Osetinsky | .................... | 359/639 |
| 2008/0002161 A1 * | 1/2008 | Streid et al. | .................... | 353/98 |

FOREIGN PATENT DOCUMENTS

| | | |
|---|---|---|
| JP | 10-333115 | 12/1998 |
| JP | 11-234597 | 8/1999 |
| JP | 2000-193926 | 7/2000 |
| WO | 97/29472 | 8/1997 |

* cited by examiner

*Primary Examiner* — Georgia Y Epps
*Assistant Examiner* — Sultan Chowdhury
(74) *Attorney, Agent, or Firm* — Renner, Otto, Boisselle & Sklar LLP

(57) ABSTRACT

A front-projection display system having a screen with improved brightness and/or resolution of an image displayed on outer portions thereof. The screen has a display surface that is generally a convex shape having a curvature of the display surface in the vertical direction of an image projected thereon that is less than a curvature of the display surface in the horizontal direction.

11 Claims, 6 Drawing Sheets

COLLIMATED VISUAL DISPLAY WITH ELLIPTICAL FRONT PROJECTION SCREEN

FIELD OF THE INVENTION

The invention herein described relates generally to display systems, and more particularly to display systems using projectors.

BACKGROUND

Collimated displays systems have long been used in widebodied aircraft simulators. The primary components of collimated displays are at least one projector, a projection screen, typically spherical, placed above and in front of the cockpit or cab of the simulator on which the projector projects an image, and a collimating mirror in front of and wrapping around the cockpit or cab for providing a large horizontal field-of-view. The projection screen can be either front or rear projected, and the projected image is viewed via the collimating mirror.

A front projection system has a number of advantages, as compared to a back projection system. Front projection screens are generally more economical to produce, and eliminate the problem of specular cross reflection prevalent in back projection curved screens with a large horizontal field-of-view. Such a cross reflection can degrade image quality, particularly resolution and contrast ratio.

The screen in a front projection system is generally more economical to produce as compared to a back projection screen. This is because in a front projection screen the incident rays reflect directly from the screen surface, thus requiring only one high optical quality surface. In a rear projection screen, the projectors project onto the concave surface of the screen forming an image on the outer convex surface, thus the screen requires two surfaces of high optical quality, and a highly transparent bulk material.

In a rear projection display system, in order to have a clear line of sight to the screen, the projectors must be positioned around the cockpit or cab being simulated. This presents some difficulty in placing a large cockpit, or cab, in a multi-projector system. Unlike in rear projection display systems, the projectors in a front projection display system can be placed outside the screen volume and project an image onto the convex outer surface of the screen. Thus, interference between the cockpit and/or cab is not generally a concern, and a wide range of cockpits and/or cabs can be placed in the simulator without having to place the projectors in a location that is difficult to access for servicing.

Front projection display systems employing spherical screens, however, suffer from diminished brightness and resolution at the top and bottom edges of the screen. This is due to the large incident angle of the impinging rays at these locations.

SUMMARY OF THE INVENTION

The present invention provides a front-projection display system having a screen with improved brightness and/or resolution of an image displayed on outer portions thereof. The screen has a display surface that is generally a convex shape having a curvature of the display surface in the vertical direction of an image projected thereon that is less than a curvature of the display surface in the horizontal direction.

Accordingly, a front-projection display system comprises a screen having a convex shape display surface for displaying an image, and a reflector for reflecting the image displayed on the display surface of the screen. The reflector and screen each have a horizontal axis and a vertical axis, and the screen axis may be tilted relative to the reflector axis.

In an exemplary embodiment, the convex shape of the display surface corresponds to an ellipsoidal segment, which can be, for example, a segment corresponding to a portion of an ellipsoid between respective poles, or a portion of a prolate spheroid such that a horizontal extent of the screen is parallel to an equator of the spheroid. In the case of a prolate spheroid, the portion of the prolate spheroid can include a hemispherical portion whereby the screen is generally circular in cross-section about a first axis, and elliptical in cross-section about a second axis orthogonal to the first axis. The curvature of the display surface in the vertical direction of the image that is less than a curvature of the display surface in the horizontal direction of the image reduces the incident angle of light from the projector onto the screen, as compared to a spherical screen thereby resulting in a higher resolution image and improved luminance uniformity across the screen. The reflector can be a spherical collimating mirror. The system can further include at least one projector for projecting the image onto the screen.

Further features of the invention will become apparent from the following detailed description when considered in conjunction with the drawings.

BRIEF DESCRIPTION OF THE DRAWINGS

In the annexed drawings.

DETAILED DESCRIPTION

Because the various aspects of the invention were conceived and developed for use in front projection collimated display systems, such as used in flight simulators and the like, it will be herein described chiefly in this context. However, the principles of the invention in their broader aspects can be adapted to other types of projection systems.

Figure 1A:
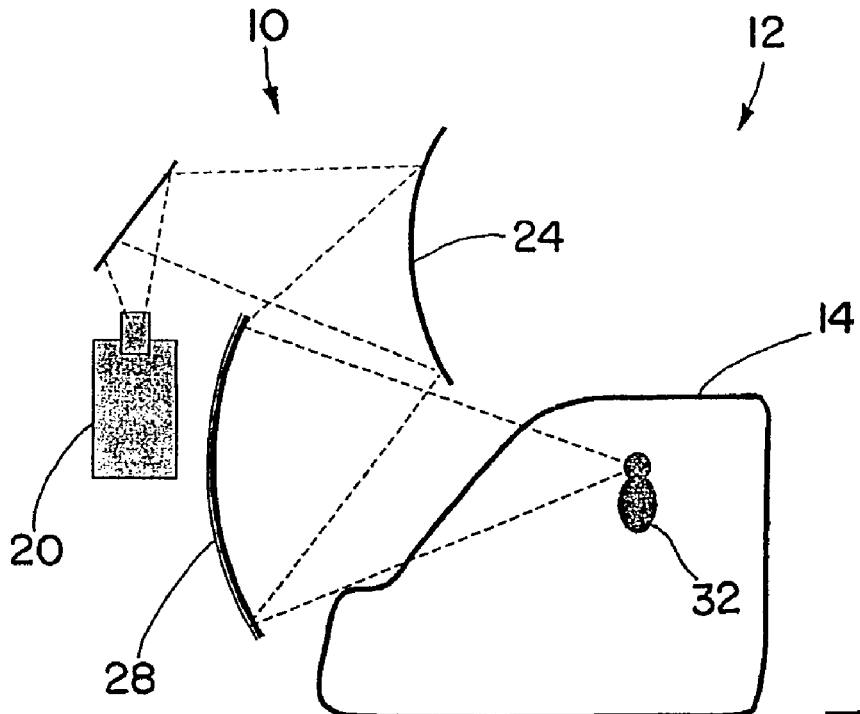
FIGS. 1A and 1B are schematic side views of simulators including exemplary front projection display systems in accordance with the invention.
Figure 1B:
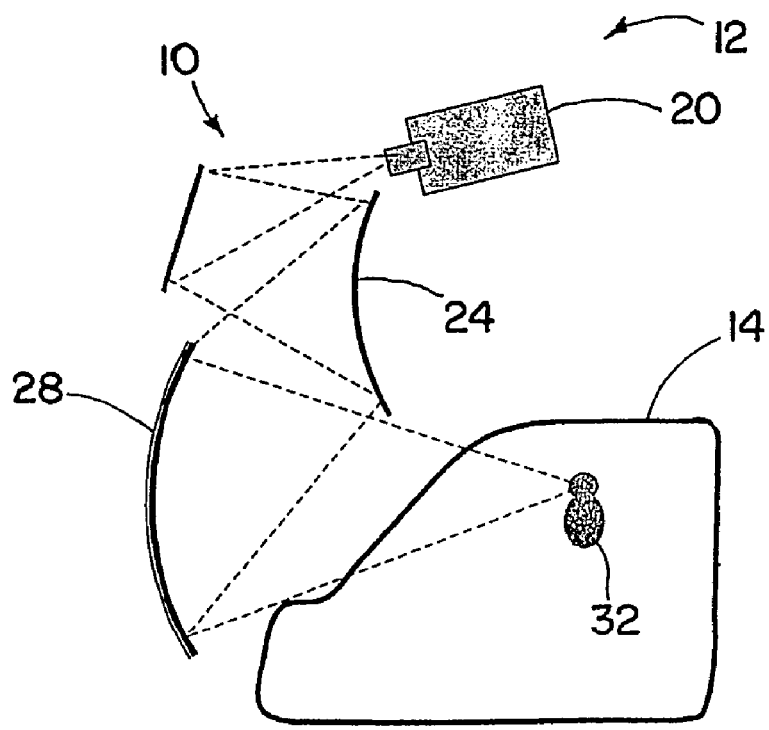

Referring now in detail to the drawings and initially to FIGS. 1A and 1B, two exemplary front-projection collimating display systems according to the invention are designated generally by reference numeral 10. The display system 10, which in the illustrated embodiment is part of a flight simulator 12 including the nose of an aircraft fuselage, or cockpit, 14, includes at least one projector 20, a curved front projection screen 24, and a reflector 28, which in the illustrated embodiment is a spherical collimating mirror. The screen 24 and mirror 28 each have a vertical and horizontal axis, and the screen 24 is vertically offset from the collimating mirror 28 and located generally above the viewing field of a pilot 32. The projector 20 projects light onto the convex surface of the screen 24 to form an image thereon. The image formed on the screen 24 is viewed by a pilot 32 sitting in the cockpit 14 via the collimating mirror 28. Although not shown, the simulator can include a suitable motion system for simulating motion of the cockpit or cab during operation of the simulator. With the exception of the front-projection screen 24, the components of the display system 10 can be typical of any conventional projection system.

Figure 2:
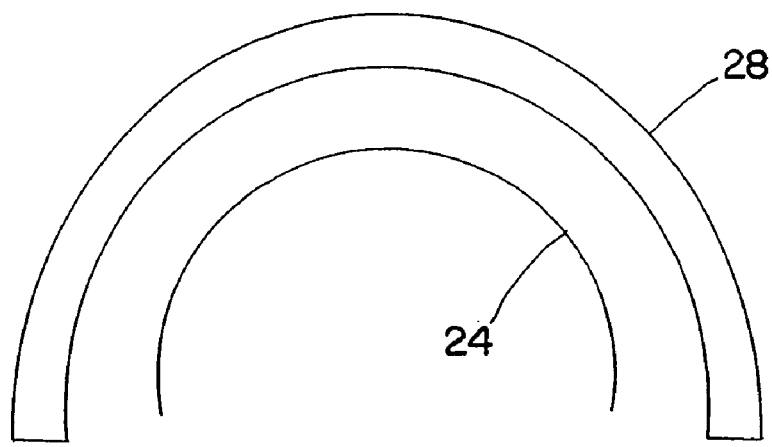
FIG. 2 is a schematic top view of a screen and reflector of the exemplary front projection display system of FIG. 1.
Figure 3:
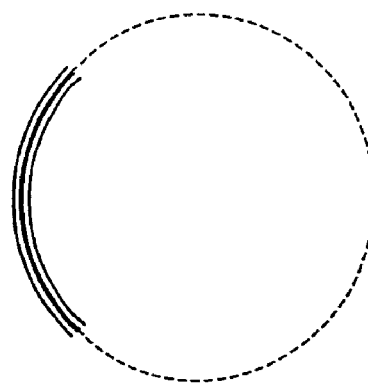
FIG. 3 is a side view of an exemplary spherical screen as presently practiced in the art.
Figure 4:
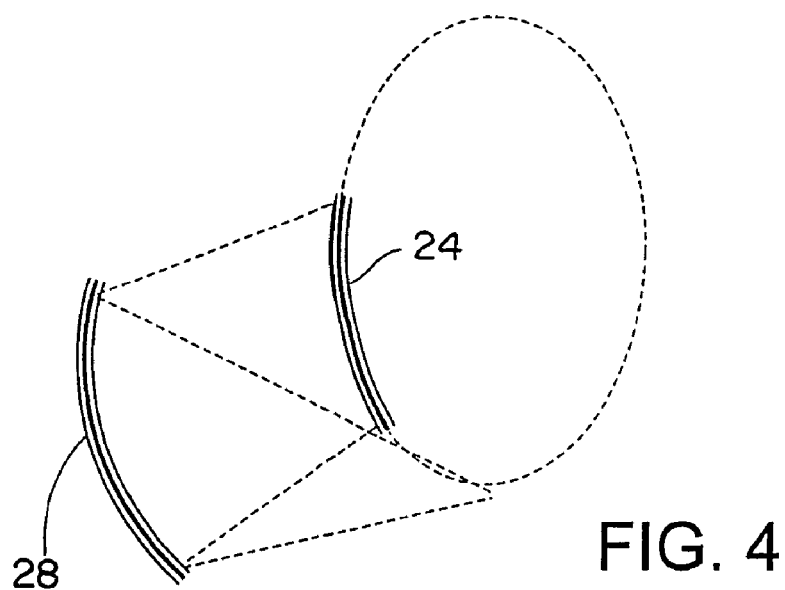
FIG. 4 is a side view of an elliptical screen of an exemplary front projection system, in accordance with the invention.

Turning now to FIGS. 2-4, and initially to FIGS. 2 and 3, the details of the screen 24 will be discussed. FIG. 2 is a schematic cross-sectional view taken through horizontal planes of both the screen 24 and the mirror 28. As previously indicated, the collimating mirror 28 is generally spherical and, therefore, in vertical and horizontal cross-section has a shape that is generally a portion of a circle. The screen 24 in horizontal cross-section also has a shape that is generally a portion of a circle, as illustrated in FIG. 2. The vertical cross section of the screen, as practiced in the present art is circular, as illustrated in FIG. 3., although the mirror center and the screen center may not be in the same location.

FIG. 4 is a cross-sectional view through a vertical plane of the screen 24, in accordance to the invention. It is seen that the screen 24 has a curvature that is generally a portion of an ellipse. Accordingly, as compared to the generally circular horizontal cross-section of the screen 24 shown in FIG. 3, the screen 24 has less curvature in the vertical direction resulting in the upper and lower portions of the screen having a "flattened" shape.

Figure 5:
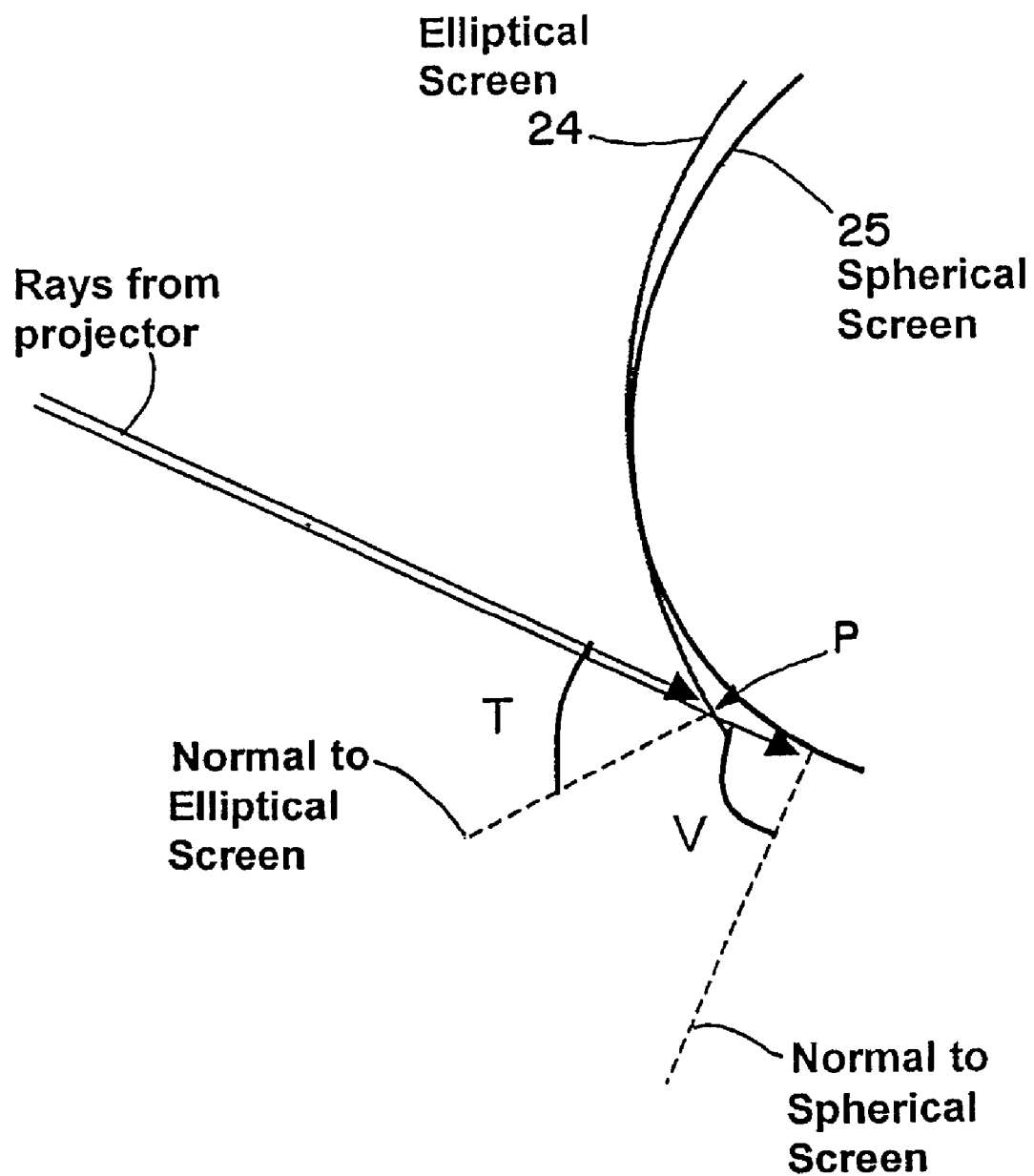
FIG. 5 is a schematic side view comparing a conventional spherical screen with an exemplary screen in accordance with the invention.

To illustrate the operation of the elliptical screen, FIG. 5 shows the vertical cross section of the elliptical screen 24 as compared to a spherical screen 25. Screen 25 has a spherical vertical cross section, and screen 24 has an elliptical vertical cross section in accordance with the invention. As illustrated in FIG. 5, the upper and lower edges of the screen 24 are generally more flat as compared to the spherical shape screen 25. At a point P at the lower portion of screen 24, the incident angle, T, of a ray impinging on the elliptical screen 24 from the projector, will be smaller, as compared to the incident angle, V, of a ray impinging on the spherical screen 25. The same is also true of a ray impinging on the elliptical screen 24 from the projector on the upper portion of the screen 24. The incident angle is the angle formed between a ray impinging on the screen at a point P, and the normal to the screen at the same point P. It will be appreciated that the reduced incident angle T results in enhanced luminance. Generally, in a display system, the higher luminance region on the screen 24 is located around the center of the screen and, thus, increasing the luminance at an edge point, such as P, will result in a more uniform luminance across the screen. In addition the reduced incident angle, T, results in a higher resolution at point P, as compared to the spherical screen.

Table 1 below provides a numerical example of the improvement, over a spherical screen, that can be achieved with a screen having an elliptical vertical cross section in accordance with the invention.

Column 1—horizontal radius of the screen, in meters
Column 2—vertical radius of the screen, in meters
Column 3—calculated resolution at bottom edge, in arcmin/(optical line pair) Note that the smaller this value, the better the resolution is.
Column 4—calculated luminance at the bottom edge, in foot-Lambert.

TABLE 1

|  | Column 1 | Column 2 | Column 3 | Column 4 |
|---|---|---|---|---|
| Elliptical screen | 1.804 | 2.103 | 6.72 | 4.17 |
| Spherical screen | 1.804 | 1.804 | 7.54 | 2.74 |

Figure 6:
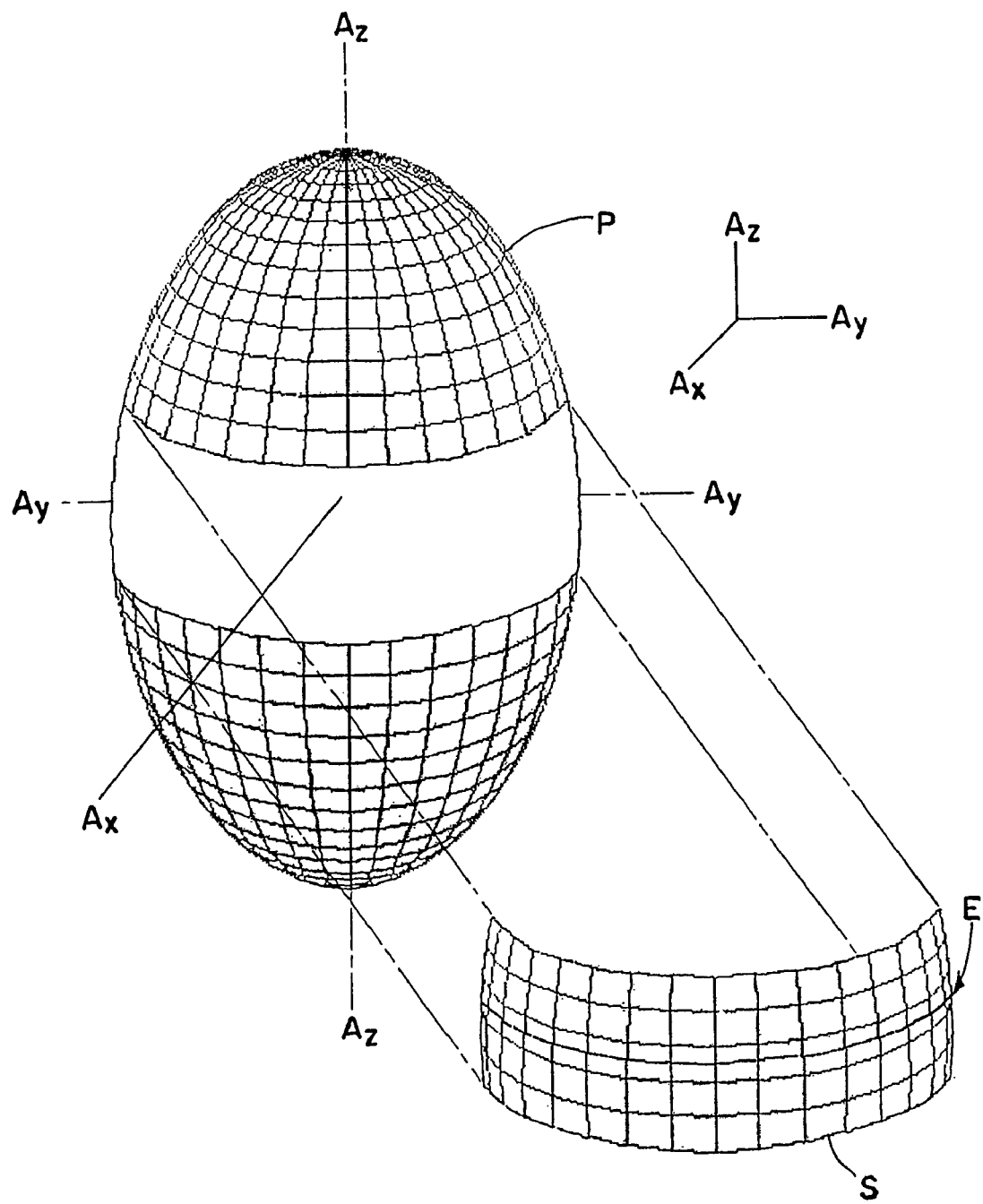
FIG. 6 is a side view of a prolate spheroid showing an exemplary ellipsoidal segment removed therefrom.

The display surface of the screen 24 can generally correspond to an ellipsoidal segment such as, for example, a portion of an ellipsoid taken from between the poles. By way of example, and with reference to FIG. 6, the screen 24 can be an ellipsoidal segment S that corresponds to a portion of a prolate spheroid P such that the screen has a circular cross-section in the horizontal plane Ax-Ay, and an elliptical cross-section in any plane perpendicular to the plane Ax-Ay. Such a screen can be generated by rotating a segment M-N around the axis of symmetry Az (as will be explained in FIG. 7). In FIG. 6, it will be appreciated that the horizontal extent of the screen may include the equator E of the spheroid.

Figure 7:
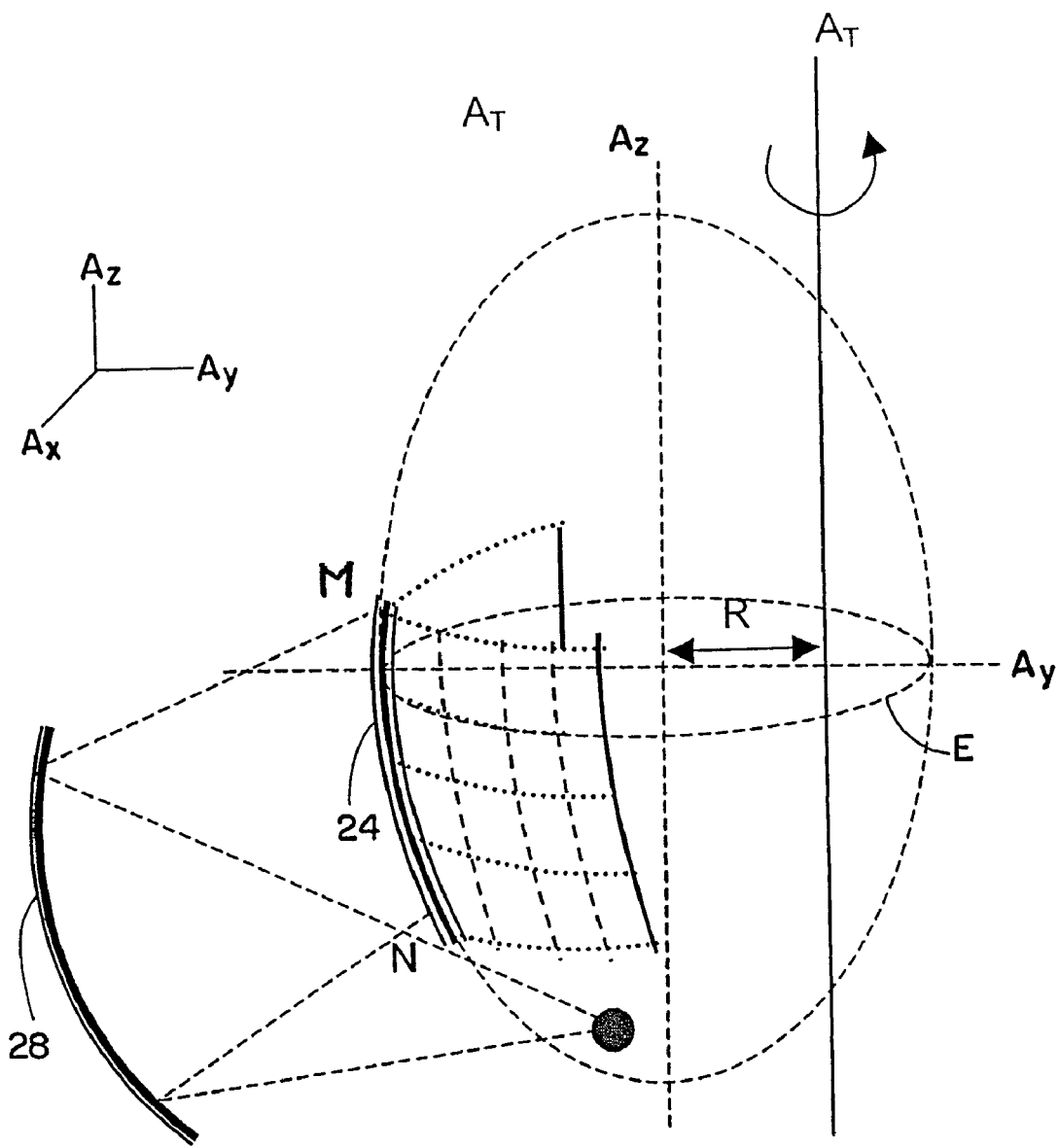
FIG. 7 is a side view of an exemplary embodiment of the invention with an elliptical screen surface having an axis of rotation that is displaced relative to the summetry axis of the ellipsoid.

In another configuration in accordance with the invention, illustrated in FIG. 7, the screen 24 can be generated by rotating the segment M-N around an axis $A_T$ that is parallel to Az but is displaced away from it a distance R. Such a screen still has a circular cross-section in the horizontal plane Ax-Ay, and an elliptic cross section in any plane perpendicular to the plane Ax-Ay. Such a screen, with spherical or elliptical cross section, may be referred to as a toroidal screen. In FIG. 7, it will be appreciated that the horizontal extent of the screen may include the equator E of the spheroid.

Figure 8:
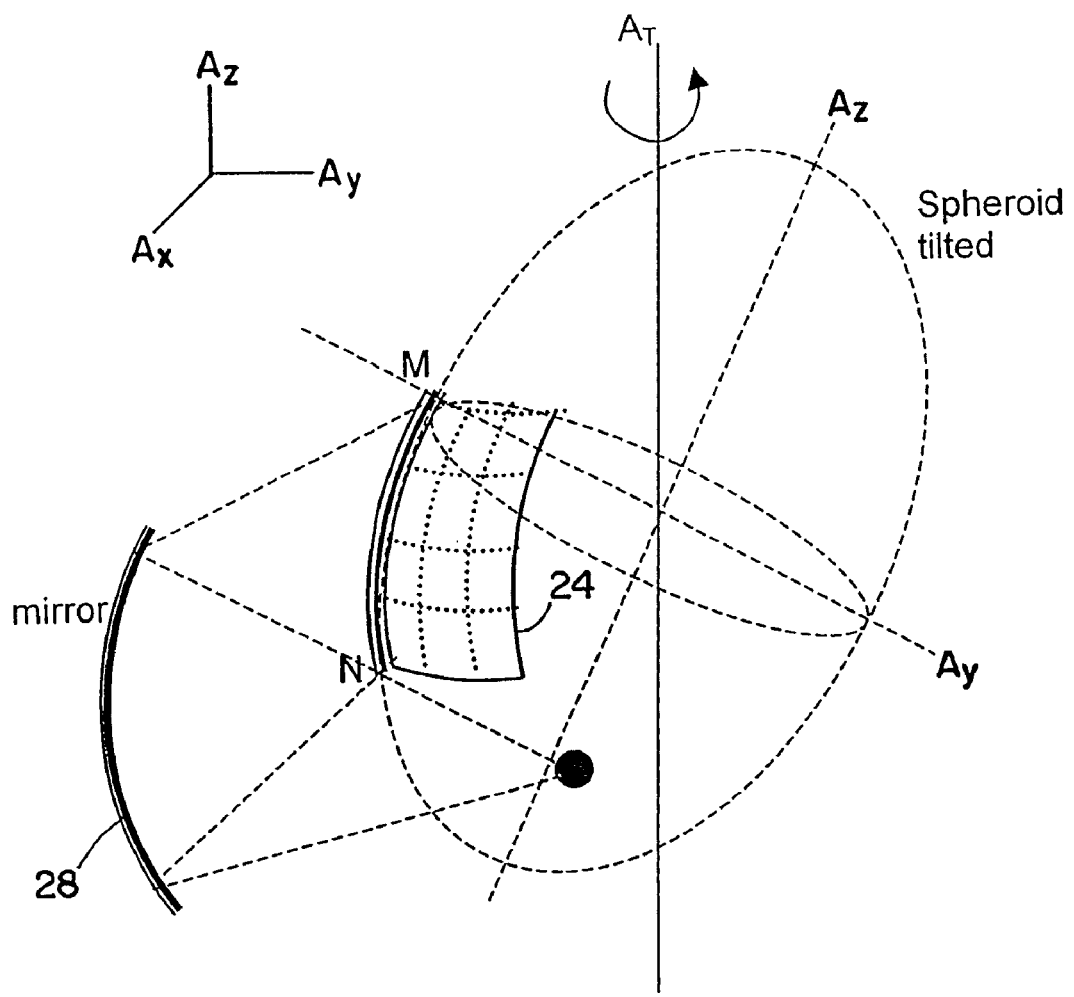
FIG. 8 is a side view of an exemplary embodiment of the invention with an elliptical screen surface having an axis that is tilted relative to the axis of the reflecting mirror.

Another example of a screen in accordance with the invention is shown in FIG. 8. The screen 24 can be generated by tilting the spheroid axis, Az, relative to the reflecting mirror 28, then rotating the segment M-N around an axis $A_T$ that is parallel to the mirror axis. The rotation axis $A_T$ may be in the same location as Az, as shown in the example in FIG. 6 and FIG. 8 or it may be displaced relative to it, as shown in FIG. 7.

In the illustrated embodiments, the screen 24 and mirror 28 both have vertical and horizontal axes, with the screen 24 being vertically offset from the mirror 28. The terms vertical and horizontal are in relation to the particular orientation of the screen 24 and mirror 28 in the figures, but it will be appreciated that the structure shown in figures can be otherwise oriented. The relative spatial arrangement of the screen 24 and mirror 28, however, will generally be consistent.

Aspects of the invention are specifically well-suited for flight simulators and the like where high resolution and luminance uniformity are desired and/or required. For example, simulators requiring a large field of view below the horizon, such as helicopter simulators, can benefit from the higher resolution and improved luminance uniformity.

In addition, it will be appreciated that other shape screens can be effective in reducing the bend angle of reflected light. By way of example, the screen might have a generally spherical central portion and be flattened towards its upper and lower edges. Such shape, while similar to the shape of the screen shown and described above, need not necessarily be elliptical.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A front projection display system comprising:
   a screen having a convex-shaped display surface; and
   a reflector for reflecting an image displayed on the screen;
   wherein the reflector and screen each have a horizontal axis and a vertical axis, the screen being vertically offset from the reflector; and
   wherein the display surface has a curvature in a vertical direction that is less than a curvature of the display surface in a horizontal direction.

2. A front projection display system as set forth in claim 1, wherein the convex shape corresponds to an ellipsoidal segment.

3. A front projection display system as set forth in claim 1, wherein the ellipsoidal segment corresponds to a portion of a prolate spheroid such that a horizontal extent of the screen is parallel to an equator of the spheroid.

4. A front-projection display system as set forth in claim 3, wherein the horizontal extent of the ellipsoidal segment includes a portion of the equator.

5. A front projection display system as set forth in claim 1, wherein the screen is a toroid with an elliptical cross section in the vertical direction.

6. A front projection display system as set forth in claim 1, wherein the screen is a toroid with an elliptical cross section in the vertical direction, and a rotation axis that is tilted relative to the mirror reflector.

7. A front projection display system as set forth in claim 1, wherein the curvature of the display surface in the vertical direction of the image that is less than a curvature of the display surface in the horizontal direction of the image reduces the incident angle of light impinging onto the screen, as compared to a spherical screen thereby resulting in a higher resolution image and improved luminance uniformity across the screen.

8. A front-projection display system as set forth in claim 1, further comprising at least one projector for projecting the image onto the display surface of the screen.

9. A front-projection display system as set forth in claim 1, wherein the reflector is a collimating mirror.

10. A front-projection display system as set forth in claim 9, wherein the collimating mirror is spherical.

11. A front-projection display system as set forth in claim 1, wherein the screen is a front projection screen.

* * * * *